Sept. 4, 1956
J. L. VELAZQUEZ
2,761,634
VERTICALLY RISING AIRPLANE
Filed Jan. 20, 1955
3 Sheets-Sheet 1
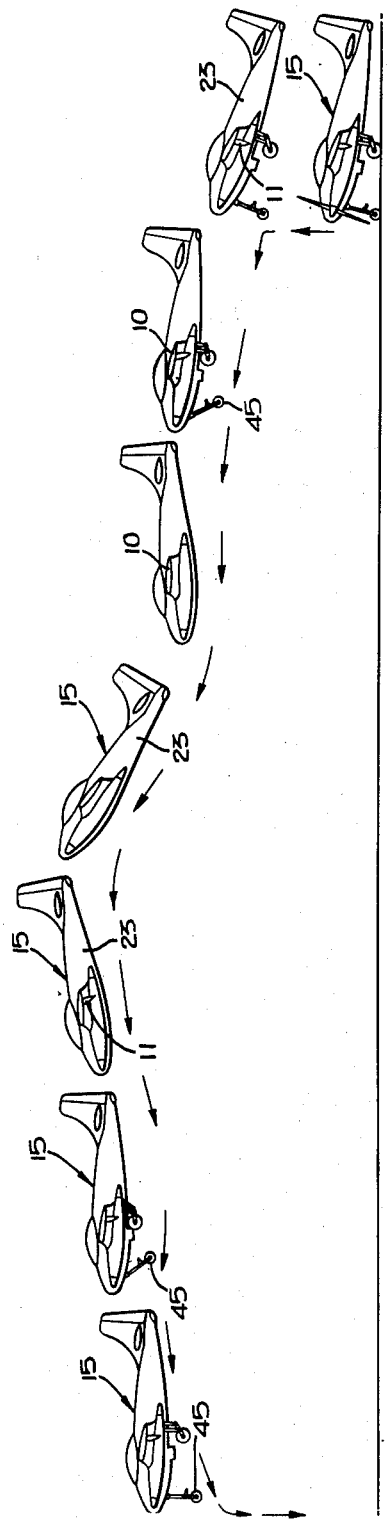
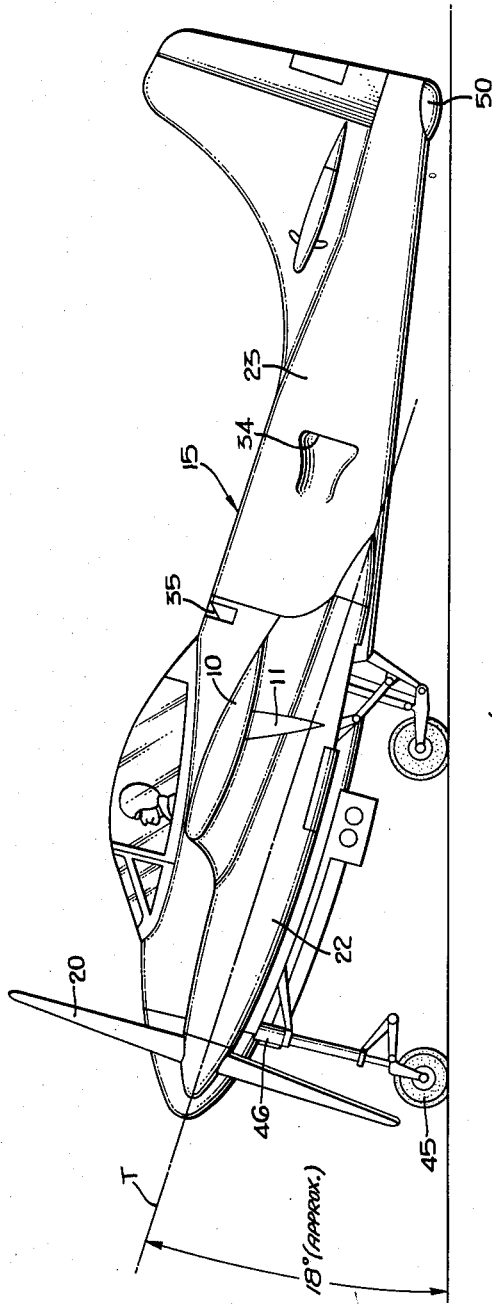
JOSE L. VELAZQUEZ, INVENTOR.
BY
*Lyon + Lyon*
ATTORNEYS

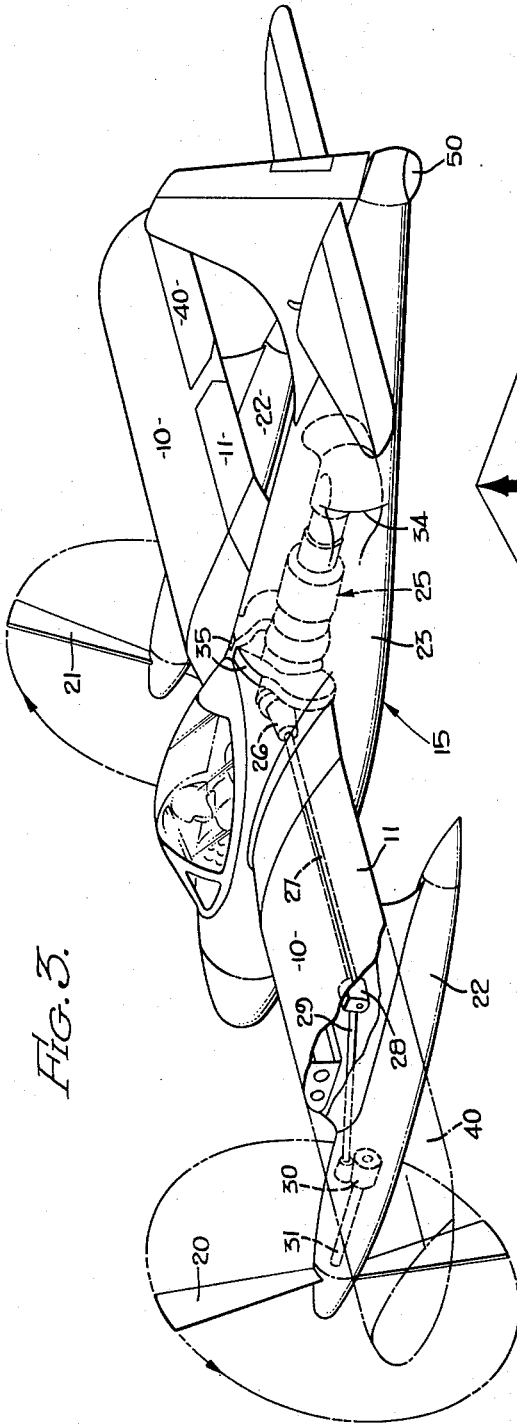

Sept. 4, 1956 J. L. VELAZQUEZ 2,761,634
VERTICALLY RISING AIRPLANE
Filed Jan. 20, 1955 3 Sheets-Sheet 3
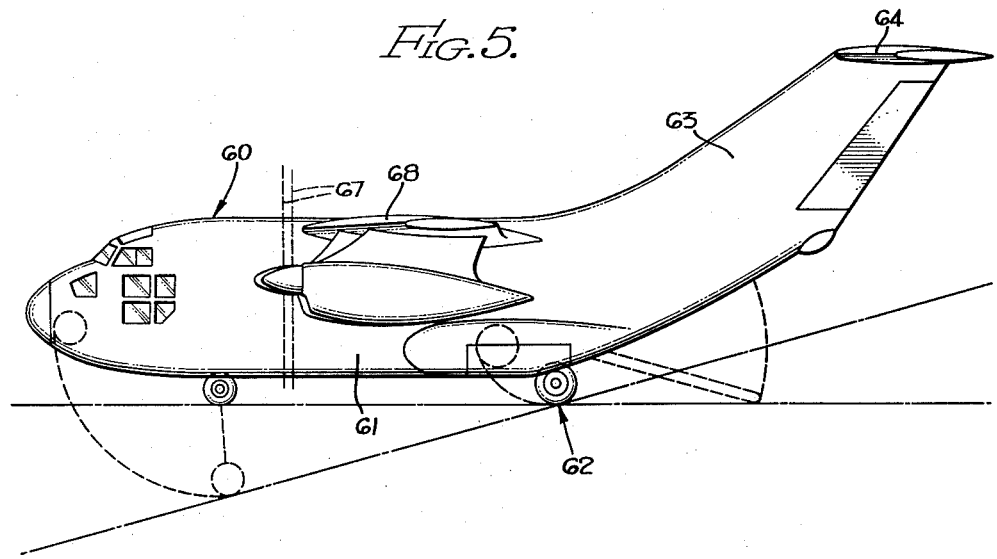
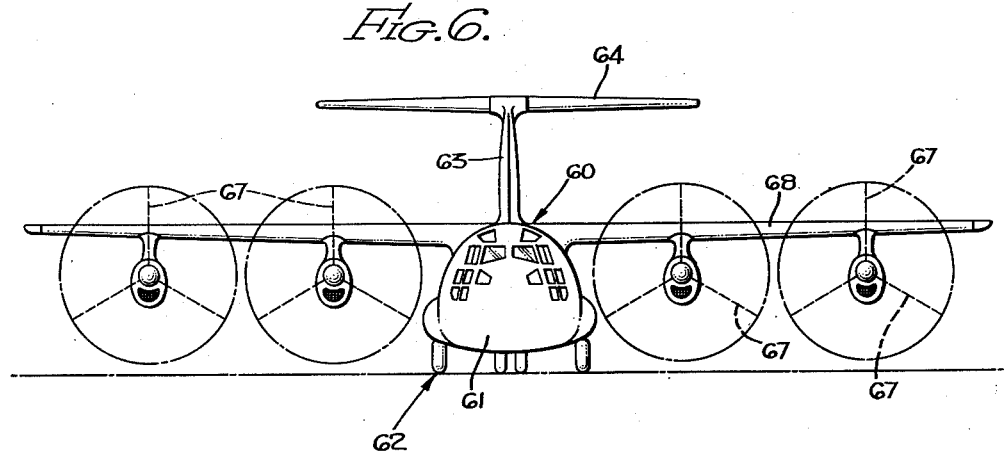
JOSE L. VELAZQUEZ,
INVENTOR.
BY
ATTORNEYS

United States Patent Office 2,761,634
Patented Sept. 4, 1956

2,761,634

VERTICALLY RISING AIRPLANE

Jose L. Velazquez, Burbank, Calif.

Application January 20, 1955, Serial No. 482,989

5 Claims. (Cl. 244—42)

This invention relates to aircraft utilizing the "redirected-slipstream" principle and has particular reference to a vertically rising and descending aircraft.

Aircraft utilizing the "redirected-slipstream" principle, as referred to in this application, is defined as an airplane the supporting lift force of which, during hovering or low-speed power-on flight, is the resultant vector sum of an upward and forward propeller thrust vector and an upward and rearward lift-drag force vector.

The existing military requirements for an airplane capable of vertical take-off and landing, yet also capable of forward speeds without limitations other than those imposed by maximum available power, have generated numerous studies and investigations aimed at the development of a configuration capable of achieving these objectives with the minimum of mechanical complication and introduction of new aerodynamic problems. It is fundamental that all that is required to produce vertical lift of a heavier-than-air machine is to impart a sufficient downward acceleration to a sufficient mass of air. This is in fact achieved with relatively low power in the case of lightly loaded helicopter rotors by imparting a relatively low velocity to a large mass of air. It is likewise attained in the recently-tested VTO-type fighter planes, which take off and land in a vertical position, by imparting a relatively high velocity to a smaller mass of air with a correspondingly higher power requirement than is the case with the helicopter.

However, it is not necessary for the thrust line of the rotor or propeller to extend in a vertical direction in order to produce the required final downward velocity of the accelerated mass of air. The same result can be obtained by imparting, through an air actuator disk or propeller, the required momentum to a stream of air in any direction from horizontal to vertical, and redirecting the slip stream by means of a wing and flaps to a final directly downward velocity, thereby, from momentum considerations, producing a purely upward vertical resultant force on the aircraft.

The achievement of such a vertically rising airplane becomes increasingly easier to attain as the maximum speed requirement increases. This is apparent from the fact that with increasing power required for higher level flight speeds, the static thrust obtainable with the same power increases up to the point at which it equals or exceeds the gross weight of the airplane. Thus it can be shown that the more recent propeller-driven, fighter-type naval airplanes have maximum static thrusts with orders of magnitude equal to the weight of such aircraft. Such aircraft would, therefore, be capable of vertical flight or hovering, except for the fact that adequate control is not available at speeds approaching zero. One of the principal objects of this invention is to provide an aircraft which is fully controllable about all three axes at zero forward speed in an essentially conventional flight attitude, and with flight speeds free of limitations associated with helicopter characteristics.

As indicated above, much study and effort is being directed toward the design of an aircraft possessing the combination of hovering characteristics with high forward speeds. Representative of such designs are the so-called convertible aircraft under development, consisting of helicopters having means for increasing forward speed, such as tilting rotors, unloaded rotors with propellers, and retractable rotors. Another approach is the VTO-type vertical thrust take-off aircraft referred to above. Thus, the two basic approaches to the problem are: (1) increasing the speed of a helicopter by various refinements or incorporation of fixed wing components; and (2) the development of an airplane towards a decreasing take-off and landing speed until hovering characteristics are obtained. The latter approach appears most likely to result in the optimum aircraft because of its relatively simpler nature and less severe design compromises. While the recent VTO-fighters are an important contribution to the solution of the problem, the vertical fuselage attitude of these types during take-off and landing may prove a serious disadvantage.

It has been established that a hovering attitude approaching the horizontal can be achieved through use of flaps to deflect the slip stream of the propellers. However, the large nose-down pitching moment produced by the extension of the flaps creates a difficult control problem. The necessity for large flap angles, created by the requirement for substantial slip stream deflection, results in a pitching moment of such large magnitude as to be impossible to trim out by any practical means associated with the conventional control system, especially inasmuch as the horizontal tail is ineffective during hovering. Several means have been heretofore investigated for trimming out this pitching moment, including aerodynamic surfaces in the slip stream ahead and aft of the wing, but such proposals have thus far been found to be impractical. It is, accordingly, another object of this invention to provide a vertically rising aircraft having novel means for compensating for the nose-down pitching moment resulting from flow of the slip stream past downwardly-deflected flap surfaces.

Other objects and advantages of this invention it is believed will be readily apparent from the following detailed description of a preferred embodiment thereof when read in connection with the accompanying drawings.

In the drawings:

Figure 1 is a side elevation of an airplane embodying this invention, in position for take-off.

Figure 2 is a diagrammatic view illustrating the flight path and attitudes of an airplane embodying this invention, during take-off and approaching a landing.

Figure 3 is a perspective view of the airplane of Figure 1, partly in section.

Figure 4 is a diagram illustrating the certain basic concepts of the invention.

Figure 5 is a side elevation of a modified form of the invention.

Figure 6 is a front elevation of the airplane of Figure 5.

In its broadest aspects, this invention includes novel means, in a hovering airplane employing flaps for deflecting the propeller slip stream, for compensating for the nose-down pitching moment which results from downward deflection of the trailing edge flaps. It has been discovered that such compensation can be obtained by positioning the propeller thrust line at a predetermined distance below the aerodynamic center of the wing such that pitching equilibrium will result about the center of gravity of the airplane. Under such conditions, the nose-down pitching moment resulting from extension or lowering of the flaps is cancelled out by the nose-up pitching moment introduced by the propeller thrust. This distance from the thrust line to the wing aerodynamic center is herein termed "Z" and is related to the thrust and wing pitching moment coefficients by the following formula:

$$Z = \frac{C_{M_F} q S_W \overline{C}_W + Wd}{T}$$

Where:

$Z$ = distance of thrust centerline below wing aerodynamic center
$C_{M_F}$ = pitching moment coefficient of flapped airfoil, including propeller contribution, nose-down direction here considered positive.
$q$ = dynamic pressure of propeller slip stream
$S_W$ = wing area immersed in slip stream
$C_W$ = average chord of wing immersed in slip stream
$T$ = propeller thrust
$W$ = airplane weight
$d$ = horizontal distance of airplane center of gravity from wing aerodynamic center in hovering attitude (positive if C. G. ahead of wing a. c., negative if C. G. aft of wing a. c., and a function of the hovering angle $\alpha$).

A schematic representation of the above symbols and equation, and the derivation thereof, is illustrated in Figure 4, wherein the wing 10 and flaps 11 are illustrated in hovering attitude. From this diagram it will be apparent that the thrust line is located so that the total resultant of the thrust, lift, drag and pitching moment extends through the airplane center of gravity.

The above-described inventive concept is embodied in an otherwise generally conventional airplane 15 wherein, as shown in Figure 1, the propeller thrust line T is positioned below the wing 10 a distance determined as pointed out above. The two variable-pitch propellers 20 and 21 are each mounted on a nacelle 22, one depending from the wing on each side of the fuselage 23. In the airplane 15, which is shown by way of example only, the two propellers are driven at constant speed by a single gas turbine engine 25 positioned within the fuselage, through transmissions including a central gear box 26, transverse drive shafts 27, right angle gear boxes 28, secondary drive shafts 29, nacelle gear boxes 30 and propeller shafts 31. Engine air intake and outlet ducts 34 and 35, respectively, are provided as shown.

Air flow deflecting means are provided and, as shown, these means include the flaps 11, one on each side of the wing 10, and the outer control surfaces 40 which are utilized as ailerons during normal flight and as flaps during hovering flight.

The airplane 15 is provided with a more or less conventional fully-retractable tricycle landing gear, with the exception that the nose wheel 45 is provided with a power cylinder assembly 46 for extension of the wheel beyond the conventional position to the take-off and landing position shown in Figure 1 wherein the thrust line T defines an angle of about 18° with the horizontal. Means are thus provided for varying the angle of the wing and thrust line with respect to the horizontal. By means of the power cylinder assembly, the nose wheel may be vertically retracted to lower the nose to a position (not shown) wherein the airplane is horizontal for ground handling purposes, including loading, unloading, towing, parking and tie-down. It will of course be understood that, due to the large size of the propellers, they must be rotated to a horizontal position before retracting the nose wheel. The nose-high attitude for take-off and landing is necessary here to provide adequate propeller clearance and minimum forward components of thrust, lift and drag.

The following is a specific example of the calculations made in designing the airplane 15 with respect to the proper positioning of the propeller thrust line in order to eliminate the nose-down pitching moment, or to bring it within controllable limits:

$C_{M_F}$ = 0.30 (estimated, considering propeller pitching moment)

$$T = \frac{2200}{0.95 \times 2} =$$

1160# (per propeller for gross weight = 2200#)

$$\text{Slip stream velocity} = \sqrt{\frac{2T}{A\rho}}$$

Where:
$T$ = Thrust
$A$ = Disc area = 63.6 sq. ft. per propeller
$\rho$ = Air density = .002378 slug/cu. ft.

$$\text{Slip stream velocity} = \sqrt{\frac{2 \times 1160}{63.6 \times .002378}}$$

$$= \sqrt{15,400}$$
$$= 124 \text{ f./sec.}$$
$$= 84.3 \text{ M. P. H.}$$

$q$ = ½ × .002378 × 124²
 = 18.3#/sq. ft.

$S_W$ = 9 × 5 = 45 sq. ft. (9 ft. propeller diameter and 5 ft. wing chord)
$C$ = 5 ft.
$W$ = 1100 lbs. (½ gross weight)
$d$ = 9.5 sin 30°
 = 9.5 (.5)
 = 4.75″
 = .396 ft.

Where:

30° = hovering angle (approx.)
9.5″ = distance of C. G. below wing aerodynamic center (a.c.)

$$Z = \frac{0.3(18.3)(45)(5) + 1100(.396)}{1160}$$

$$= \frac{1240 + 435}{1160}$$

$$= \frac{1675}{1160}$$

$$= 1.435 \text{ ft.}$$

$$= 17.2 \text{ in.}$$

Thus it will be understood that the location of the thrust line 17.2 inches below the aerodynamic center of the wing with nominal airplane design center of gravity location as indicated in Figure 4 will result in pitching moment equilibrium for the airplane 15, under nominal hovering conditions. Variation of actual conditions from these nominal design conditions will produce pitching moments of lesser magnitude which can be trimmed out through longitudinal control by proper simultaneous manipulation of the flaps. Such variations will naturally arise from changes in hovering attitude or angle, location of the airplane center of gravity, flap angle inaccuracies, etc. Conversely, it is thus readily apparent that the specific distance "Z" may be varied from that calculated, so long as the major portion of the nose-down pitching moment is trimmed out and the remaining moment can be taken care of by flap control.

It will be noted from an inspection of Figure 3 that the propellers 20 and 21 are counter-rotating. This is essential for an aircraft of this type in order to eliminate torque effects during hovering. Additionally, it will be noted that the propeller 20 rotates in a counter-clockwise direction when seen from the rear, and the propeller 21 rotates in a clockwise direction when seen from the rear. This specific direction of rotation is also an important consideration from the standpoint of optimum utilization of the wing and flap surfaces in transforming the helical slip stream into smooth, unidirectional flow, inasmuch as the usually larger, inboard wing surfaces receive the upwardly and rearwardly-directed flow and the smaller, outboard surfaces receive the downwardly and rearwardly-directed flow.

The flight characteristics of the airplane 15 in forward flight are conventional in all respects, control being obtained through the conventional elevator, aileron and rudder control surfaces. Figure 2 illustrates the various attitudes of the airplane in flight, wherein the arrows indicate the path from take-off to landing. Take-off and the hovering condition is attained by increase in power and blade angle of the constant-speed propellers after the nose gear extension operation is completed. As shown, the hovering angle is about 30°. Forward flight results from lowering of the nose of the aircraft, whereupon conventional maneuvers, such as the climb illustrated, may be carried out. Landing procedure is very similar to that employed by carrier-based aircraft during a partial power carrier landing. In this case the flaps are extended gradually simultaneous with power increase, speed reduction and raising of the nose until a zero speed nose-high, full-hovering-power condition is reached at conveniently low altitude. Zero speed vertical descent is then made by a slight decrease in power.

During hovering flight, control about the three axes is readily obtained. Longitudinal control (pitching moment) is obtained by simultaneous deflection of the flaps. Lateral control (rolling moment) is obtained by a differential change to the pitch of the propellers. Directional control (yawing moment) is obtained by differential deflection of the flaps. The moments produced by these motions act independently about reference axes parallel and perpendicular to the ground and, therefore, have mixed components when related to the nose-high airplane axis. The control system incorporates over-center mechanisms (not shown) interconnected with the flap motions so that as the flaps retract, the system gradually reverts to the conventional system used for forward flight.

Lowering of the thrust line in accordance with this invention results in advantages other than elimination of uncontrollable pitching moments, as follows:

1. It has been established by powered model tests that a pronounced "ground effect" results which produces increased lift for the same thrust as compared to a conventional arrangement with the thrustline and wing chord plane coinciding.

2. A nose-up pitching moment is induced on the propellers by the lower velocity existing in the propeller inflow below the wing.

3. Delayed separation and improved turning effectiveness results from a major portion of the flow being turned under positive pressure conditions below the wing.

The airplane 15 is an economical modification of an existing aircraft and, accordingly, the rear thereof has only limited ground clearance during hovering, and during landing the tail bumper 50 may touch the ground before the main landing gear. The modified form of the invention shown for purposes of illustration in Figures 5 and 6 as a cargo-transport-type airplane 60 is designed specifically for additional ground clearance in the nose-up attitude. As shown, this is accomplished by terminating the aft end of the fuselage 61 a relatively short distance aft of the main landing gear 62 and extending the vertical tail 63 at a swept-back angle to provide support for the horizontal tail 64 located in a T arrangement at the top of the vertical tail. In addition to providing the desired ground clearance, the configuration thus described has the following advantages:

1. The vertical tail serves a double purpose, providing directional stability and supporting the horizontal tail.

2. By locating the horizontal tail at the upper end of the vertical tail, maximum lever arm of the horizontal tail about the airplane center of gravity is obtained, thus rendering it most effective and reducing required size for adequate longitudinal stability.

3. This vertical tail has less drag than a bent-up thicker fuselage.

4. The high location of the horizontal tail places it at a maximum distance away from the ground when the airplane is in the hovering attitude and in close proximity to the ground. This results in reduction of any undesirable pitching moments which may result from interaction of the propeller slipstream, the ground, and the tail.

5. This high location produces an end-plate effect on the vertical tail, thereby increasing its effective aspect ratio, and directional stability of the airplane.

6. Although the airplane illustrated is intended to operate at speeds not seriously affected by compressibility, the swept-back vertical tail and horizontal T tail will facilitate development into higher-speed designs in which swept-back surfaces and high location of the horizontal tail are required.

While the airplane 60 has four engines and propellers 67, it incorporates the invention of the airplane 15 in that the propeller thrust line is located below the wing 68 a distance Z calculated in accordance with the formula set forth above.

It will be understood to those skilled in the art that this invention in its broadest aspects has wide application and is not limited to vertically rising aircraft in the strict sense of the term. That is, the invention also finds utility in airplanes designed for power-on, low-speed, short run take-offs and landings where, as in the case with the true vertically rising craft, operations including take-off and landing may be performed at speeds at or below the point at which the empennage becomes ineffective. Under such conditions the lift and control means are obtained principally from the interaction of the propeller thrust and the wing lift and drag resulting from the propeller slip stream. Such airplanes are known to those skilled in the art as utilizing the "redirected slipstream" principle, as specifically defined above. It will also be understood that if runway facilities are available, the airplane of this invention may be operated utilizing conventional horizontal running take-off and landing procedures, which permit increases of 200% or more in the pay-load.

Having fully described my invention, it is to be understood that I do not wish to be limited to the details set forth, but my invention is of the full scope of the appended claims.

I claim:

1. In a redirected-slipstream airplane, the combination of a fuselage having an empennage, a propulsive system comprising at least two propellers and drive means therefor, a single wing carried by said fuselage rearwardly of said propellers and having its leading edge in the path of the slipstream of said propellers, flap means operatively connected with said wing and movable relative thereto for deflecting said slipstream in a downward direction and substantially clear of said empennage to cause the airplane to rise substantially vertically and to allow the airplane to approach or attain hovering flight in a generally horizontal attitude, the thrust line of said propellers being generally parallel with the chord of said wing and disposed below the aerodynamic center of said wing a sufficient distance to counteract a substantial amount of the nose-down pitching moment resulting from said slipstream deflection, and means for operating said flap means to provide the necessary airstream deflection to afford control and maintain equilibrium of the airplane at zero or low forward flight air speeds and at which time said empennage is substantially ineffective in exercising aerodynamic control.

2. In a redirected-slipstream airplane, the combination of a fuselage having an empennage, a propulsive system including at least two propellers and drive means therefor, a single wing carried by said fuselage rearwardly of said propellers and having its leading edge in the path of the slipstream of said propellers, said wing having means supporting said propellers, and flap means operatively connected with said wing and movable relative thereto for deflecting said slipstream in a downward direction and substantially clear of said empennage to cause the airplane to rise substantially vertically and to allow the airplane to approach or attain hovering flight in a generally horizontal attitude, the thrust line of said propellers being positioned below the aerodynamic center of said wing in a fixed position generally parallel to said wing and at a sufficient distance below said wing to counteract a substantial amount of the nose-down pitching moment resulting from said slipstream deflection at zero or low forward flight air speeds and at which time said empennage is substantially ineffective to offset said nose-down pitching moment.

3. A redirected-slipstream airplane as defined in claim 2 having landing gear including extensible nose gear for varying the angle of incidence of said wing and propeller thrust lines with respect to the horizontal.

4. A redirected-slipstream airplane as defined in claim 2 in which the power means rotates said propellers in directions such that the propeller tips move toward said fuselage during passage through the lower half of their circle of rotation.

5. A redirected-slipstream airplane as defined in claim 2 in which the fuselage has a T-shaped empennage including a horizontal tail positioned above the propeller slipstream.

References Cited in the file of this patent

UNITED STATES PATENTS

| | | |
|---|---|---|
| D. 153,411 | Zipp | Apr. 12, 1949 |
| D. 157,353 | Ebel | Feb. 21, 1950 |
| 1,716,439 | Gray | June 11, 1929 |
| 1,895,388 | Gheorghe | Jan. 24, 1933 |
| 1,933,307 | Bolas | Oct. 31, 1933 |
| 2,108,093 | Zimmerman | Feb. 15, 1938 |
| 2,685,420 | Burnelli | Aug. 3, 1954 |

FOREIGN PATENTS

| | | |
|---|---|---|
| 345,910 | Great Britain | Apr. 2, 1931 |